US008130746B2

(12) United States Patent
Schrempp

(10) Patent No.: US 8,130,746 B2
(45) Date of Patent: Mar. 6, 2012

(54) SYSTEM FOR DISTRIBUTING DECOY CONTENT IN A PEER TO PEER NETWORK

(75) Inventor: James B. Schrempp, Saratoga, CA (US)

(73) Assignee: Audible Magic Corporation, Los Gatos, CA (US)

( * ) Notice: Subject to any disclaimer, the term of this patent is extended or adjusted under 35 U.S.C. 154(b) by 564 days.

(21) Appl. No.: 11/191,493

(22) Filed: Jul. 27, 2005

(65) Prior Publication Data

US 2006/0034177 A1    Feb. 16, 2006

Related U.S. Application Data

(60) Provisional application No. 60/592,232, filed on Jul. 28, 2004.

(51) Int. Cl.
*H04L 12/28* (2006.01)
*G06F 7/04* (2006.01)

(52) U.S. Cl. .......................................... 370/351; 726/26
(58) Field of Classification Search .................. 370/351, 370/254
See application file for complete search history.

(56) References Cited

U.S. PATENT DOCUMENTS

| | | | |
|---|---|---|---|
| 3,919,479 A | 11/1975 | Moon et al. ................. | 179/1 SB |
| 4,230,990 A | 10/1980 | Lert, Jr. et al. ................ | 455/67 |
| 4,449,249 A | 5/1984 | Price ................ | 455/45 |
| 4,450,531 A | 5/1984 | Kenyon et al. ................ | 364/604 |
| 4,454,594 A | 6/1984 | Heffron et al. | |
| 4,677,455 A | 6/1987 | Okajima ................ | 357/38 |
| 4,677,466 A | 6/1987 | Lert, Jr. et al. ................ | 358/84 |
| 4,739,398 A | 4/1988 | Thomas et al. ................ | 358/84 |
| 4,843,562 A | 6/1989 | Kenyon et al. ................ | 364/487 |
| 4,918,730 A | 4/1990 | Schulze | |
| 5,210,820 A | 5/1993 | Kenyon ................ | 395/2 |
| 5,247,688 A | 9/1993 | Ishigami | |
| 5,283,819 A | 2/1994 | Glick et al. ................ | 379/90 |
| 5,327,521 A | 7/1994 | Savic et al. | |
| 5,437,050 A | 7/1995 | Lamb et al. ................ | 455/2 |
| 5,442,645 A | 8/1995 | Ugon et al. ................ | 371/25.1 |

(Continued)

FOREIGN PATENT DOCUMENTS

EP    0349106 A1    1/1990

(Continued)

OTHER PUBLICATIONS

L. Baum et al., "A Maximization Technique Occurring in the Statistical Analysis of Probabilistic Functions of Markov Chains," *The Annals of Mathematical Statistics*,, vol. 41, No. 1 pp. 164-171, 1970 (no month).

(Continued)

*Primary Examiner* — Dang T Ton
*Assistant Examiner* — Kevin Lee
(74) *Attorney, Agent, or Firm* — Lowenstein Sandler PC

(57) ABSTRACT

A system for generating and distributing decoy data for a work in a Peer to Peer network. The system is included in software providing a Peer to Peer connection for a processing system. The processing system receives data for a work over a Peer to Peer connection. The system then determines whether, the work is a protected work. If the work is a protected work, the system insert decoy data into the data of the work and stores the data of the work including the decoy data in memory. The data of the work including the decoy data is then made available for transfer over the Peer to Peer network by the processing system.

21 Claims, 5 Drawing Sheets

U.S. PATENT DOCUMENTS

| | | | | |
|---|---|---|---|---|
| 5,504,518 | A | 4/1996 | Ellis et al. | 348/2 |
| 5,581,658 | A | 12/1996 | O Hagan et al. | 395/22 |
| 5,588,119 | A | 12/1996 | Vincent | |
| 5,612,729 | A | 3/1997 | Ellis et al. | |
| 5,612,974 | A | 3/1997 | Astrachan | |
| 5,613,004 | A | 3/1997 | Cooperman et al. | 380/28 |
| 5,638,443 | A | 6/1997 | Stefik et al. | |
| 5,692,213 | A | 11/1997 | Goldberg et al. | |
| 5,701,452 | A | 12/1997 | Siefert | |
| 5,710,916 | A | 1/1998 | Barbara et al. | 395/609 |
| 5,724,605 | A | 3/1998 | Wissner | |
| 5,732,193 | A | 3/1998 | Aberson | |
| 5,850,388 | A | 12/1998 | Anderson et al. | |
| 5,881,182 | A | 3/1999 | Fiete et al. | |
| 5,918,223 | A * | 6/1999 | Blum et al. | 707/1 |
| 5,924,071 | A | 7/1999 | Morgan et al. | |
| 5,930,369 | A | 7/1999 | Cox et al. | 380/54 |
| 5,943,422 | A | 8/1999 | Van Wie et al. | |
| 5,949,885 | A | 9/1999 | Leighton | 380/54 |
| 5,959,659 | A | 9/1999 | Dokic | |
| 5,983,176 | A | 11/1999 | Hoffert et al. | 704/233 |
| 6,006,183 | A | 12/1999 | Lai et al. | 704/235 |
| 6,006,256 | A | 12/1999 | Zdepski et al. | 709/217 |
| 6,011,758 | A | 1/2000 | Dockes et al. | 369/30 |
| 6,026,439 | A | 2/2000 | Chowdhury et al. | 709/223 |
| 6,044,402 | A | 3/2000 | Jacobson et al. | 709/225 |
| 6,067,369 | A | 5/2000 | Kamei | |
| 6,088,455 | A | 7/2000 | Logan et al. | |
| 6,092,040 | A | 7/2000 | Voran | |
| 6,096,961 | A | 8/2000 | Bruti et al. | 84/609 |
| 6,118,450 | A | 9/2000 | Proehl et al. | 345/349 |
| 6,192,340 | B1 | 2/2001 | Abecassis | 704/270 |
| 6,195,693 | B1 | 2/2001 | Berry et al. | |
| 6,229,922 | B1 | 5/2001 | Sasakawa et al. | |
| 6,243,615 | B1 | 6/2001 | Neway et al. | 700/108 |
| 6,243,725 | B1 | 6/2001 | Hempleman et al. | 707/530 |
| 6,253,193 | B1 | 6/2001 | Ginter et al. | 705/57 |
| 6,253,337 | B1 | 6/2001 | Maloney et al. | 714/38 |
| 6,279,010 | B1 | 8/2001 | Anderson | 707/202 |
| 6,279,124 | B1 | 8/2001 | Brouwer et al. | 714/38 |
| 6,285,596 | B1 | 9/2001 | Miura et al. | |
| 6,330,593 | B1 | 12/2001 | Roberts et al. | 709/217 |
| 6,345,256 | B1 | 2/2002 | Milsted et al. | 705/1 |
| 6,374,260 | B1 | 4/2002 | Hoffert et al. | 707/104.1 |
| 6,385,596 | B1 | 5/2002 | Wiser et al. | 705/51 |
| 6,418,421 | B1 | 7/2002 | Hurtado et al. | 705/54 |
| 6,422,061 | B1 | 7/2002 | Sunshine et al. | 73/29.01 |
| 6,438,556 | B1 | 8/2002 | Malik et al. | |
| 6,449,226 | B1 | 9/2002 | Kumagai | 369/47.1 |
| 6,452,874 | B1 | 9/2002 | Otsuka et al. | 369/14 |
| 6,453,252 | B1 | 9/2002 | Laroche | 702/75 |
| 6,460,050 | B1 | 10/2002 | Pace et al. | |
| 6,463,508 | B1 | 10/2002 | Wolf et al. | |
| 6,477,704 | B1 | 11/2002 | Cremia | 725/35 |
| 6,487,641 | B1 | 11/2002 | Cusson et al. | |
| 6,490,279 | B1 | 12/2002 | Chen et al. | |
| 6,496,802 | B1 | 12/2002 | van Zoest et al. | 705/14 |
| 6,526,411 | B1 | 2/2003 | Ward | |
| 6,542,869 | B1 | 4/2003 | Foote | 704/500 |
| 6,550,001 | B1 | 4/2003 | Corwin et al. | |
| 6,550,011 | B1 | 4/2003 | Sims, III | 713/193 |
| 6,552,254 | B2 | 4/2003 | Hasegawa et al. | |
| 6,591,245 | B1 | 7/2003 | Klug | 705/10 |
| 6,609,093 | B1 | 8/2003 | Gopinath et al. | |
| 6,609,105 | B2 | 8/2003 | Van Zoest et al. | 705/14 |
| 6,628,737 | B1 | 9/2003 | Timus | |
| 6,636,965 | B1 | 10/2003 | Beyda et al. | |
| 6,654,757 | B1 | 11/2003 | Stern | 707/101 |
| 6,732,180 | B1 | 5/2004 | Hale et al. | 709/229 |
| 6,771,316 | B1 | 8/2004 | Iggulden | |
| 6,771,885 | B1 | 8/2004 | Agnihotri et al. | 386/83 |
| 6,834,308 | B1 | 12/2004 | Ikezoye et al. | 709/231 |
| 6,947,909 | B1 | 9/2005 | Hoke, Jr. | |
| 6,968,337 | B2 | 11/2005 | Wold | |
| 7,043,536 | B1 | 5/2006 | Philyaw et al. | |
| 7,047,241 | B1 | 5/2006 | Erickson et al. | |
| 7,058,223 | B2 | 6/2006 | Cox et al. | |
| 7,181,398 | B2 | 2/2007 | Thong et al. | |
| 7,266,645 | B2 * | 9/2007 | Garg et al. | 711/133 |
| 7,269,556 | B2 | 9/2007 | Kiss et al. | |
| 7,281,272 | B1 * | 10/2007 | Rubin et al. | 726/26 |
| 7,289,643 | B2 | 10/2007 | Brunk et al. | |
| 7,349,552 | B2 | 3/2008 | Levy et al. | |
| 7,363,278 | B2 | 4/2008 | Schmelzer et al. | |
| 7,500,007 | B2 | 3/2009 | Ikezoye et al. | |
| 7,529,659 | B2 | 5/2009 | Wold | |
| 7,562,012 | B1 | 7/2009 | Wold | |
| 7,565,327 | B2 | 7/2009 | Schmelzer | |
| 7,593,576 | B2 | 9/2009 | Meyer et al. | |
| 2001/0013061 | A1 | 8/2001 | DeMartin et al. | 709/217 |
| 2001/0027522 | A1 | 10/2001 | Saito | 713/193 |
| 2001/0034219 | A1 | 10/2001 | Hewitt et al. | |
| 2001/0037304 | A1 | 11/2001 | Paiz | 705/52 |
| 2001/0056430 | A1 | 12/2001 | Yankowski | |
| 2002/0049760 | A1 | 4/2002 | Scott et al. | |
| 2002/0064149 | A1 | 5/2002 | Elliott et al. | 370/352 |
| 2002/0082999 | A1 | 6/2002 | Lee et al. | 705/51 |
| 2002/0087885 | A1 | 7/2002 | Peled et al. | 713/201 |
| 2002/0120577 | A1 | 8/2002 | Hans et al. | |
| 2002/0123990 | A1 | 9/2002 | Abe et al. | 707/3 |
| 2002/0129140 | A1 | 9/2002 | Peled et al. | |
| 2002/0133494 | A1 | 9/2002 | Goedken | 707/10 |
| 2002/0152261 | A1 | 10/2002 | Arkin et al. | |
| 2002/0152262 | A1 | 10/2002 | Arkin et al. | |
| 2002/0156737 | A1 | 10/2002 | Kahn et al. | |
| 2002/0158737 | A1 | 10/2002 | Yokoyama | |
| 2002/0186887 | A1 | 12/2002 | Rhoads | |
| 2002/0198789 | A1 | 12/2002 | Waldman | 705/26 |
| 2003/0014530 | A1 | 1/2003 | Bodin et al. | 709/231 |
| 2003/0018709 | A1 | 1/2003 | Schrempp et al. | |
| 2003/0023852 | A1 | 1/2003 | Wold | |
| 2003/0033321 | A1 | 2/2003 | Schrempp et al. | |
| 2003/0037010 | A1 | 2/2003 | Schmelzer et al. | |
| 2003/0051100 | A1 | 3/2003 | Patel | |
| 2003/0061352 | A1 | 3/2003 | Bohrer et al. | 709/226 |
| 2003/0061490 | A1 | 3/2003 | Abajian | |
| 2003/0095660 | A1 * | 5/2003 | Lee et al. | 380/231 |
| 2003/0135623 | A1 | 7/2003 | Schrempp et al. | |
| 2003/0191719 | A1 | 10/2003 | Ginter et al. | |
| 2003/0195852 | A1 * | 10/2003 | Campbell et al. | 705/51 |
| 2004/0008864 | A1 | 1/2004 | Watson et al. | |
| 2004/0010495 | A1 | 1/2004 | Kramer et al. | |
| 2004/0053654 | A1 | 3/2004 | Kokumai et al. | |
| 2004/0073513 | A1 | 4/2004 | Stefik et al. | |
| 2004/0089142 | A1 | 5/2004 | Georges et al. | |
| 2004/0133797 | A1 | 7/2004 | Arnold | |
| 2004/0148191 | A1 | 7/2004 | Hoke, Jr. | |
| 2004/0163106 | A1 | 8/2004 | Schrempp et al. | |
| 2004/0167858 | A1 | 8/2004 | Erickson | |
| 2004/0201784 | A9 | 10/2004 | Dagtas et al. | |
| 2005/0021783 | A1 | 1/2005 | Ishii | |
| 2005/0039000 | A1 | 2/2005 | Erickson | |
| 2005/0044189 | A1 | 2/2005 | Ikezoye et al. | 709/219 |
| 2005/0097059 | A1 | 5/2005 | Shuster | |
| 2005/0154678 | A1 | 7/2005 | Schmelzer | |
| 2005/0154680 | A1 | 7/2005 | Schmelzer | |
| 2005/0154681 | A1 | 7/2005 | Schmelzer | |
| 2005/0216433 | A1 | 9/2005 | Bland et al. | |
| 2005/0267945 | A1 * | 12/2005 | Cohen et al. | 709/215 |
| 2005/0289065 | A1 | 12/2005 | Weare | |
| 2006/0062426 | A1 | 3/2006 | Levy et al. | |
| 2007/0074147 | A1 | 3/2007 | Wold | |
| 2007/0078769 | A1 * | 4/2007 | Way | 705/51 |
| 2008/0008173 | A1 | 1/2008 | Kanevsky et al. | |
| 2008/0133415 | A1 | 6/2008 | Ginter et al. | |
| 2008/0141379 | A1 | 6/2008 | Schmelzer | |
| 2008/0154730 | A1 | 6/2008 | Schmelzer et al. | |
| 2008/0155116 | A1 | 6/2008 | Schmelzer | |
| 2009/0030651 | A1 | 1/2009 | Wold | |
| 2009/0031326 | A1 | 1/2009 | Wold | |
| 2009/0043870 | A1 | 2/2009 | Ikezoye et al. | |
| 2009/0077673 | A1 | 3/2009 | Schmelzer | |
| 2009/0089586 | A1 | 4/2009 | Brunk | |
| 2009/0192640 | A1 | 7/2009 | Wold | |
| 2009/0240361 | A1 | 9/2009 | Wold et al. | |
| 2009/0328236 | A1 | 12/2009 | Schmelzer | |

FOREIGN PATENT DOCUMENTS

| | | |
|---|---|---|
| EP | 0 402 210 A1 | 6/1990 |
| EP | 0 459 046 A1 | 4/1991 |
| EP | 0 517 405 A2 | 5/1992 |
| EP | 0689316 A2 | 12/1995 |
| EP | 0 731 446 A1 | 9/1996 |
| EP | 0 859 503 A2 | 8/1998 |
| EP | 1 354 276 A2 | 10/2003 |
| EP | 1 449 103 A1 | 8/2004 |
| EP | 1 485 815 A1 | 12/2004 |
| EP | 1 593 018 A2 | 11/2005 |
| EP | 1485815 B1 | 10/2009 |
| WO | 96/36163 A2 | 11/1996 |
| WO | 98/20672 A2 | 5/1998 |
| WO | 00/05650 A1 | 2/2000 |
| WO | 00/39954 A1 | 7/2000 |
| WO | WO 00/63800 A1 | 10/2000 |
| WO | WO 01/23981 A1 | 4/2001 |
| WO | WO 01/47179 | 6/2001 |
| WO | WO 01/52540 | 7/2001 |
| WO | WO 01/62004 | 8/2001 |
| WO | WO 02/03203 | 1/2002 |
| WO | WO 02/15035 A2 | 2/2002 |
| WO | WO 02/37316 A2 | 5/2002 |
| WO | WO 02/37316 A3 | 5/2002 |
| WO | WO 02/082271 A1 | 10/2002 |
| WO | WO 03/007235 A1 | 1/2003 |
| WO | WO 03/009149 A1 | 1/2003 |
| WO | WO 03/036496 A1 | 5/2003 |
| WO | WO 03/067459 A1 | 5/2003 |
| WO | WO 03/091990 A1 | 11/2003 |
| WO | WO 2004/044820 A1 | 5/2004 |
| WO | WO 2004/070558 A2 | 8/2004 |
| WO | WO 2009/017710 | 2/2009 |

OTHER PUBLICATIONS

A. P. Dempster et al. "Maximum Likelihood from Incomplete Data via the $EM$ Algorithm," *Journal of the Royal Statistical Society*, Series B (Methodological), vol. 39, Issue 1, pp. 1-38, 1977 (no month).

D. Reynolds et al., "Robust Text-Independent Speaker Identification Using Gaussian Mixture Speaker Models," *IEEE Transactions on Speech and Audio Processing*, vol. 3, No. 1, pp. 72-83, Jan. 1995.

B. Pellom et al., "Fast Likelihood Computation Techniques in Nearest-Neighbor Based search for Continuous Speech Recognition," *IEEE Signal Processing Letters*, vol. 8. No. 8 pp. 221-224, Aug. 2001.

J. Haitsma et al., "Robust Audio Hashing for Content Identification," *CBMI 2001*, Second International Workshop on Content Based Multimedia and Indexing, Brescia, Italy., Sep. 19-21, 2001.

"PacketHound Tech Specs," www.palisdesys.com/products/packethound/tech_specs/prod_Phtechspecs.shtml, 2002 (no month).

"How Does PacketHound Work?," www.palisadesys.com/products/packethound/how_does_it_work/prod_Phhow.shtml, 2002 (no month).

Corresponding PCT Application No. PCT/US0526887 International Search Report, May 3, 2006, pp. 1 & 3.

European Supplemental Search Report for Corresponding PCT/US0210615, May 6, 2006, pp. 1 & 3. (02725522.3).

European Supplemental Search Report for Corresponding PCT/US0222931, Jun. 6, 2006, pp. 1-3. (02756525.8-2212).

Ohtsuki K. et al., "Topic Extraction Based on Continuous Speech Recognition in Broadcast-news Speech", Automatic Speech Recognition and Understanding, Dec. 14, 1997, IEEE Workshop, IEEE, New York, NY, USA, pp. 527-534. Cited in European Supplemental Search Report for Corresponding PCT/US0222931, Category A, abstract. Relevant to Claim 9, 14, 40, 45. 40, 45.

Zawodny, Jeremy D., "A C Program to Compute CDDB discids on Linux and FreeBSD", [Online], Apr. 14, 2001, Retrieved from the Internet: URL:http://jeremy.zawodny.com/c/discid/discid-linux-1.3.tar.gz, [Retrieved on Jun. 6, 2006]. Cited in European Supplemental Search Report for Corresponding PCT/US0222931, Category A, the whole document. Relevant to Claim 9, 14, 40, 45. 40, 45.

Kanth, K. V. Ravi et al, "Dimensionality Reduction for Similarity Searching in Dynamic Databases", Computer Vision and Image Understanding, Jul./Aug. 1999, vol. 75, No. 1-2, Academic Press, San Diego, CA, US, pp. 59-72. Cited in European Supplemental Search Report for Corresponding PCT/US02222460, Category X, abstract. Relevant to Claim 1,2, 5-18.

Wold, E. et al., "Content-Based Classification, Search and Retrieval of Audio", 1996, vol. 3, No. 3, IEEE Multimedia, IEEE Service Center, New York, NY, US, pp. 27-36. Cited in European Supplemental Search Report for Corresponding PCT/US02222460, Category Y, abstract. Relevant to Claim 3,4,19, 20. Also the "Retrieving Sounds", Category A, section on p. 30, left-hand col.-right hand col. Relevant to Claim 1,2, 5-18.

Wang, Yao et al., "Mulitmedia Content Analysis", IEEE Signal Processing Magazine, Nov. 2000, IEEE Service Center, New York, NY, USA, pp. 12-36. Cited in European Supplemental Search Report for Corresponding PCT/US02222460, Category A, p. 13, right-hand col.-p. 17, right-hand col. Relevant to Claim 3,4,19, 20.

European Supplemental Search Report for Corresponding PCT/US0222460, May 8, 2006, pp. 1-3. (02752347.1-2201).

Beritelli, F., et al., "Multilayer Chaotic Encryption for Secure Communications in packet switching Networks," IEEE, vol. 2Aug. 2000, pp. 1575-1582.

Blum, T., Keislar, D., Wheaton, J., and Wold, E., "Audio Databases with Content-Based Retrieval," Prodeedings of the 1995 International Joint Conference on Artificial Intelligence (IJCAI) Workshop on Intelligent Multimedia Information Retrieval, 1995.

Breslin, Pat, et al., Relatable Website, "Emusic uses Relatable's open source audio recongnition solution, TRM, to signature its music catabblog for MusicBrainz database," http://www.relatable.com/news/pressrelease/001017.release.html, Oct. 17, 2000.

Cosi, P., De Poli, G., Prandoni, P., "Timbre Characterization with Mel-Cepstrum and Neural Nets," Proceedings of the 1994 International Computer Music Conference, pp. 42-45, San Francisco, No date.

Feiten, B. and Gunzel, S., "Automatic Indexing of a Sound Database Using Self-Organizing Neural Nets," Computer Music Journal, 18:3, pp. 53-65, Fall 1994.

Fischer, S., Lienhart, R., and Effelsberg, W., "Automatic Recognition of Film Genres," Reihe Informatik, Jun. 1995, Universitat Mannheim, Praktische Informatik IV, L15, 16, D-68131 Mannheim.

Foote, J., "A Similarity Measure for Automatic Audio Classification," Institute of Systems Science, National University of Singapore, 1977, Singapore.

Gonzalez, R. and Melih, K., "Content Based Retrieval of Audio," The Institute for Telecommunication Research, University of Wollongong, Australia, No date.

Keislar, D., Blum, T., Wheaton, J., and Wold, E., "Audio Analysis for Content-Based Retrieval" Proceedings of the 1995 International Computer Music Conference.

Reynolds, D., et al. , "Robust Text-Independent Speaker Identification Using Gaussian Mixture Speaker Models", *IEEE Transactions on Speech and Audio Procsessing*, vol. 3, No. 1, pp. 72-83 Jan. 1995.

Scheirer, E., Slaney, M., "Construction and Evaluation of a Robust Multifeature Speech/Music Discriminator," pp. 1-4, Proceedings of ICASSP-97, Apr. 2-24, Munich, Germany.

Scheirer, E.D., "Tempo and Beat Analysis of Acoustic Musical Signals," Machine Listening Group, E15-401D MIT Media Laboratory, pp. 1-21, Aug. 8, 1997, Cambridge, MA.

Schneier, Bruce, Applied Cryptography, Protocols, Algorithms and Source Code in C, Chapter 2 Protocol Building Blocks, 1996, pp. 30-31.

Smith, Alan J., "Cache Memories," Computer Surveys, Sep. 1982, University of California, Berkeley, California, vol. 14, No. 3, pp. 1-61.

Vertegaal, R. and Bonis, E., "ISEE: An Intuitive Sound Editing Environment," Computer Music Journal, 18:2, pp. 21-22, Summer 1994.

European Patent Application No. 02756525.8, Supplementary European Search Report Dated Jun. 28, 2006, 4 pages.

European Patent Application No. 02782170, Supplementary European Search Report Dated Feb. 7, 2007, 4 pages.

European Patent Application No. 02725522.3, Supplementary European Search Report Dated May 12, 2006, 2 Pages.

PCT Search Report PCT/US01/50295, International Search Report dated May 14, 2003, 5 Pages.
PCT Search Report PCT/US02/33186, International Search Report dated Dec. 16, 2002, pp. 1-4.
PCT Search Report PCT/US04/02748, International Search Report and Written Opinion dated Aug. 20, 2007, 6 Pages.
PCT Search Report PCT/US08/09127, International Search Report dated Oct. 30, 2008, 8 Pages.
Audible Magic Office Action for U.S. Appl. No. 09/511,632 mailed Dec. 4, 2002.
Audible Magic Office Action for U.S. Appl. No. 09/511,632 mailed May 13, 2003.
Audible Magic Office Action for U.S. Appl. No. 09/511,632 mailed Aug. 27, 2003.
Audible Magic Office Action for U.S. Appl. No. 09/511,632 mailed Feb. 5, 2004.
Audible Magic Notice of Allowance for U.S. Appl. No. 09/511,632 mailed Aug. 10, 2004.
Audible Magic Notice of Allowance for U.S. Appl. No. 10/955,841 mailed Sep. 25, 2006.
Audible Magic Notice of Allowance for U.S. Appl. No. 10/955,841 mailed Mar. 23, 2007.
Audible Magic Notice of Allowance for U.S. Appl. No. 10/955,841 mailed Sep. 11, 2007.
Audible Magic Notice of Allowance for U.S. Appl. No. 10/955,841 mailed Feb. 25, 2008.
Audible Magic Office Action for U.S. Appl. No. 08/897,662 mailed Aug. 13, 1998.
Audible Magic Notice of Allowance for U.S. Appl. No. 08/897,662 mailed Jan. 29, 1999.
Audible Magic Office Action for U.S. Appl. No. 09/706,227 mailed May 5, 2004.
Audible Magic Office Action for U.S. Appl. No. 09/706,227 mailed Nov. 12, 2004.
Audible Magic Office Action for U.S. Appl. No. 09/706,227 mailed May 9, 2005.
Audible Magic Office Action for U.S. Appl. No. 09/706,227 mailed Nov. 1, 2005.
Audible Magic Office Action for U.S. Appl. No. 09/706,227 mailed Jun. 23, 2006.
Audible Magic Office Action for U.S. Appl. No. 09/706,227 mailed Nov. 7, 2006.
Audible Magic Office Action for U.S. Appl. No. 09/706,227 mailed Mar. 29, 2007.
Audible Magic Office Action for U.S. Appl. No. 09/706,227 mailed Sep. 17, 2007.
Audible Magic Office Action for U.S. Appl. No. 09/706,227 mailed May 29, 2008.
Audible Magic Office Action for U.S. Appl. No. 09/706,227 mailed Jan. 9, 2009.
Audible Magic Office Action for U.S. Appl. No. 10/192,783 mailed Dec. 13, 2004.
Audible Magic Notice of Allowance for U.S. Appl. No. 10/192,783 mailed Jun. 7, 2005.
Audible Magic Notice of Allowance for U.S. Appl. No. 11/239,543 mailed Apr. 23, 2008.
Audible Magic Notice of Allowance for U.S. Appl. No. 11/239,543 mailed Feb. 25, 2008.
Audible Magic Office Action for U.S. Appl. No. 09/910,680 mailed Nov. 17, 2004.
Audible Magic Office Action for U.S. Appl. No. 09/910,680 mailed May 16, 2005.
Audible Magic Office Action for U.S. Appl. No. 09/910,680 mailed Sep. 29, 2005.
Audible Magic Office Action for U.S. Appl. No. 09/910,680 mailed Jun. 23, 2006.
Audible Magic Office Action for U.S. Appl. No. 09/910,680 mailed Aug. 8, 2006.
Audible Magic Office Action for U.S. Appl. No. 09/910,680 mailed Jan. 25, 2007.
Audible Magic Office Action for U.S. Appl. No. 09/910,680 mailed Dec. 5, 2007.
Audible Magic Office Action for U.S. Appl. No. 09/999,763 mailed Apr. 6, 2005.
Audible Magic Office Action for U.S. Appl. No. 09/999,763 mailed Oct. 6, 2005.
Audible Magic Office Action for U.S. Appl. No. 09/999,763 mailed Apr. 7, 2006.
Audible Magic Office Action for U.S. Appl. No. 09/999,763 mailed Oct. 6, 2006.
Audible Magic Office Action for U.S. Appl. No. 09/999,763 mailed Mar. 7, 2007.
Audible Magic Office Action for U.S. Appl. No. 09/999,763 mailed Aug. 20, 2007.
Audible Magic Office Action for U.S. Appl. No. 09/999,763 mailed Jan. 7, 2008.
Audible Magic Office Action for U.S. Appl. No. 09/999,763 mailed Jun. 27, 2008.
Audible Magic Office Action for U.S. Appl. No. 09/999,763 mailed Dec. 22, 2008.
Audible Magic Office Action for U.S. Appl. No. 10/072,238 mailed May 3, 2005.
Audible Magic Office Action for U.S. Appl. No. 10/072,238 mailed Oct. 25, 2005.
Audible Magic Office Action for U.S. Appl. No. 10/072,238 mailed Apr. 25, 2006.
Audible Magic Office Action for U.S. Appl. No. 10/072,238 mailed Sep. 19, 2007.
Audible Magic Office Action for U.S. Appl. No. 10/072,238 mailed Apr. 7, 2008.
Audible Magic Office Action for U.S. Appl. No. 10/072,238 mailed Oct. 1, 2008.
Audible Magic Office Action for U.S. Appl. No. 11/116,710 mailed Dec. 13, 2004.
Audible Magic Office Action for U.S. Appl. No. 11/116,710 mailed Apr. 8, 2005.
Audible Magic Office Action for U.S. Appl. No. 11/116,710 mailed Oct. 7, 2005.
Audible Magic Office Action for U.S. Appl. No. 11/116,710 mailed Apr. 20, 2006.
Audible Magic Office Action for U.S. Appl. No. 11/116,710 mailed Jul. 31, 2006.
Audible Magic Office Action for U.S. Appl. No. 11/116,710 mailed Jan. 16, 2007.
Audible Magic Notice of Allowance for U.S. Appl. No. 11/116,710 mailed Nov. 19, 2007.
Audible Magic Notice of Allowance for U.S. Appl. No. 12/042,023 mailed Dec. 29, 2008.
Audible Magic Office Action for U.S. Appl. No. 11/048,307 mailed Aug. 22, 2007.
Audible Magic Office Action for U.S. Appl. No. 11/048,307 mailed May 16, 2008.
Audible Magic Office Action for U.S. Appl. No. 11/048,308 mailed Feb. 25, 2008.
Audible Magic Office Action for U.S. Appl. No. 11/048,308 mailed Mar. 5, 2009.
Audible Magic Office Action for U.S. Appl. No. 11/048,338 mailed Apr. 18, 2007.
Audible Magic Office Action for U.S. Appl. No. 11/048,338 mailed Oct. 11, 2007.
Audible Magic Office Action for U.S. Appl. No. 11/048,338 mailed Jan. 14, 2008.
Audible Magic Office Action for U.S. Appl. No. 11/048,338 mailed Jul. 9, 2008.
Audible Magic Office Action for U.S. Appl. No. 11/048,338 mailed Jan. 7, 2009.
Audible Magic Office Action for U.S. Appl. No. 12/035,599 mailed Nov. 17, 2008.
Audible Magic Office Action for U.S. Appl. No. 12/035,609 mailed Dec. 29, 2008.
Audible Magic Office Action for U.S. Appl. No. 10/356,318 mailed May 24, 2006.
Audible Magic Office Action for U.S. Appl. No. 10/356,318 mailed Nov. 2, 2006.

Audible Magic Office Action for U.S. Appl. No. 10/356,318 mailed Apr. 11, 2007.
Audible Magic Office Action for U.S. Appl. No. 10/356,318 mailed Nov. 1, 2007.
Audible Magic Office Action for U.S. Appl. No. 10/356,318 mailed May 9, 2008.
Audible Magic Office Action for U.S. Appl. No. 10/356,318 mailed Jan. 6, 2009.
Business Wire, "Cisco and Fox Host Groundbreaking Screening of Titan A.E.; Animated Epic Will Be First Film Ever to be Digitaly Transmitted Over the Internet Monday," Jun. 5, 2000, 08:14 EDT.
Business Wire, "IBM: IBM Announces New Descrambler Software; First to Offer Software to Work With Digital Video Chips," Jun. 5, 25, 1997, 07:49.
Audible Magic Office Action for U.S. Appl. No. 11/239,543 mailed Apr. 23, 2008.
Audible Magic Notice of Allowance for U.S. Appl. No. 11/239,543 mailed Nov. 6, 2008.
Audible Magic Notice of Allowance for U.S. Appl. No. 11/239,543 mailed Feb. 25, 2009.
Audible Magic Notice of Allowance for U.S. Appl. No. 12/042,023 mailed Jun. 25, 2009.
Audible Magic Notice of Allowance for U.S. Appl. No. 11/048,307 mailed May 29, 2009.
Audible Magic Office Action for U.S. Appl. No. 11/048,338 mailed Jul. 6, 2009.
Audible Magic Office Action for U.S. Appl. No. 12/035,599 mailed May 29, 2009.
Audible Magic Office Action for U.S. Appl. No. 12/035,609 mailed Jun. 24, 2009.
Audible Magic Office Action for U.S. Appl. No. 10/356,318 mailed Jun. 15, 2009.
Yong-Cong Chen, et al, A Secure and Robust Digital Watermaking Technique by the Blcok Cipher RC6 and Secure Hash Algorithm, Deparment of Computer Science, National Tsing Hua University, 2001.
Gasaway Laura, Close of Century Sees New Copyright Amendments, Mar. 200, Information Outlook, 4, 3, 42.
Harris, Lesley Ellen, "To register or not," Mar. 2006, Information Outlook, 10, 3, 32(s).
Pankanti, Sharath, "Verification Watermarks on Fingerprint Recognition and Retrieval," Part of IS&T/SPIE Conference on Security and Watermarking of Multimedia Contents, San Jose, CA Jan. 1999, SPIE vol. 3657, pp. 66-78.
Audible Magic Office Action for U.S. Appl. No. 09/999,763 mailed Jul. 20, 2009.
Audible Magic Office Action for U.S. Appl. No. 09/999,763 mailed Dec. 21, 2009.
Audible Magic Notice of Allowance for U.S. Appl. No. 11/048,308 mailed Aug. 7, 2009.
Audible Magic Office Action for U.S. Appl. No. 11/048,338 mailed Dec. 28, 2009.
Audible Magic Office Action for U.S. Appl. No. 12/035,599 mailed Nov. 24, 2009.
Audible Magic Notice of Allowance for U.S. Appl. No. 12/035,609 mailed Dec. 11, 2009.
Audible Magic Office Action for U.S. Appl. No. 10/356,318 mailed Jan. 21, 2010.
European Patent Application No. 04706547.9 European Search Report Dated Feb. 25, 2010, 3 Pages.
Audible Magic Notice of Allowance for U.S. Appl. No. 12/251,404 mailed May 14, 2010.
Audible Magic Office Action for U.S. Appl. No. 09/999,763 mailed Jun. 23, 2010.
Audible Magic Office Action for U.S. Appl. No. 10/072,238 mailed Jan. 9, 2009.
Audible Magic Office Action for U.S. Appl. No. 10/072,238 mailed Mar. 31, 2009.
Audible Magic Office Action for U.S. Appl. No. 10/072,238 mailed Aug. 6, 2010.
Audible Magic Notice of Allowance for U.S. Appl. No. 12/042,023 mailed Mar. 8, 2010.
Audible Magic Office Action for U.S. Appl. No. 11/048,338 mailed Jun. 24, 2010.
Audible Magic Office Action for U.S. Appl. No. 12/035,599 mailed Jun. 9, 2010.
Audible Magic Notice of Allowance for U.S. Appl. No. 12/277,291 mailed May 12, 2010.
European Patent Application No. 05778109.8 European Search Report Dated Sep. 10, 2010, 7 Pages.
Audible Magic Office Action for U.S. Appl. No. 12/410,445 mailed Aug. 10, 2010.
Audible Magic Notice of Allowance for U.S. Appl. No. 12/410,445 mailed Oct. 20, 2010.
Audible Magic Notice of Allowance for U.S. Appl. No. 09/999,763 mailed Sep. 16, 2010.
Audible Magic Office Action for U.S. Appl. No. 12/488,504 mailed Nov. 10, 2010.
Audible Magic Office Action for U.S. Appl. No. 11/829,662 mailed Oct. 8, 2010.
Audible Magic Office Action for U.S. Appl. No. 11/923,491 mailed Nov. 12, 2010.

* cited by examiner

SYSTEM FOR DISTRIBUTING DECOY CONTENT IN A PEER TO PEER NETWORK

CROSS REFERENCE TO RELATED APPLICATIONS

This application claims priority to U.S. Provisional Patent Application No. 60/592,232, filed Jul. 28, 2004, which is hereby incorporated by reference as if set forth herein.

FIELD OF THE INVENTION

This invention relates to Peer to Peer connections of processing devices over a network. More particularly, this invention relates to the creation and distribution of decoy content to discourage unauthorized transfers of protected works. Still more particularly, this invention relates to a system where Peer to Peer software in a processing device detects a transfer of a protected work to the processing device and generates decoy data in the received data of the work for storage in the processing device.

BACKGROUND

There are many so called "Peer to Peer" (P2P) products available for connecting processing devices over a network to share data between the processing devices. The P2P products are typically software that are executed by the processing device to provide a connection between the processing devices. The products allow a user to designate a collection of files that are to be "shared." That is, these files are made available for retrieval by other processing devices executing the P2P software. The P2P products also allow a user to locate files of interest on another processing system and to retrieve files from the other processing system. Typical P2P products run on top of vastly interconnected and loosely coupled networks. These networks run on top of typical networks like TCP, UDP, ATM, etc.

Intellectual property right holders of a work typically have a right to payment when the work is used. For purposes of the present discussion, a work is anything that is fixed in a tangible medium. Some examples of works include, but are not limited to, audio renderings, video renderings, images, video/audio renderings, and software. An example of an audio rendering include a song and/or other audio track. Examples of video renderings include an animation and/or a video sequence. Examples of an image include a photograph and/or paintings. Examples of audio/video renderings include movies, television shows, and cartoons. Examples of software include word processing programs and video games.

Most works have a property right, such as a copyright associated with a work. Thus, the owner of the property right is entitled to a royalty or other form of compensation for use of the work. For example, an owner of a song copyright, such as a songwriter, is entitled to a royalty for each copy of the recording produced.

Courts today have sometimes found that the transfer of a work over a network constitutes a use of that work and thus a license is required from the copyright holder and some form of payment is typically due.

The files that are transferred over Peer to Peer "P2P" networks often are the embodiment of intellectual property of a work i.e. a copyright protected work. The transfer of files containing protected works is often done without the permission of the owner of the right.

Some copyright holders have taken objection to P2P file transfers and have taken steps to disrupt these transfers. As one example, a right holder might become a peer in one of these networks. This peer will share what appears to be a copy of a desirable work. However, that copy will in fact be defective in some way. The copy might be damaged or might even contain other content that the right holder wishes to convey. Damaged or substitute content is called "decoy" content.

The right holders might take aggressive steps to introduce these damaged files into these P2P networks. The right holders might not act as just one peer on the network, but act as hundreds or thousands, or hundreds of thousands of peers, thus flooding the network with damaged files. This action is called "spoofing." Their intent is to make the network unreliable for the transmission of their works. Their hope is that an unreliable network will discourage users from transferring these works.

However, as aggressive as this sounds, the approach is not effective. P2P products have become adept at sharing information between peers. When one peer finds that decoy content is being shared by a particular IP address, it alerts other peers and the other peers in turn alert others. The source IP address is quickly eliminated from the network and the spoofer becomes ineffective. Some networks are able to eliminate entire IP address ranges from their scope. Some P2P products use a hash code or other mechanism to verify that the downloaded content is not damaged and reject any work with damaged content.

Thus, there is a need in the art for a method of introducing decoy material into a P2P network that can defeat the detect of the spoofed material in order to allow propagation of the spoofed material through a P2P network to discourage unauthorized transfers over the network of a protected work.

SUMMARY OF THE INVENTION

The above and other problems are solved and an advance in the art is made by the decoy data generation and distribution system for a P2P network in accordance with this invention. The main advantage of this invention is that a system is provided in which decoy data is inserted into a file including valid data of a protected work. Thus, the decoy is distributed over the network with identification data of a valid copy of a protected work. This makes the detection and elimination of decoy data from a P2P network harder and encourages authorized transfers of a protected work.

In accordance with this invention, the decoy generation and decoy system may be included in the P2P software being executed by a processing device. The system may be included in the software operating on all processing devices in the P2P network or may be executed by certain processing systems in the network.

The decoy data generation and distribution system operates in the following manner in accordance with this invention. A processing device executing P2P software including the instructions for a system in accordance with this invention connects to a P2P network. The processing device then requests a work from a second processing device or peer on the network. The data for the work is then transferred from the second processing device to the processing device.

When the data is received, the instructions for the system are executed which identify the received work. The system then determines whether the received work is a protected work. This may done by comparing the identity to a list of protected works stored in the processing system or by transmitting the identity to another processing device for determination. If the work is determined to be a protected work, the system alters the data stored in the file of the work to generate decoy data. The file is then stored in memory by the processing system. All identification information for the transferred work is also stored and used for making the file with the decoy data available to other processing devices on the P2P network.

BRIEF DESCRIPTION OF THE DRAWINGS

The above and other advantages and features of this invention are described in the detailed description given below and the following drawings.

DETAILED DESCRIPTION

Figure 1:
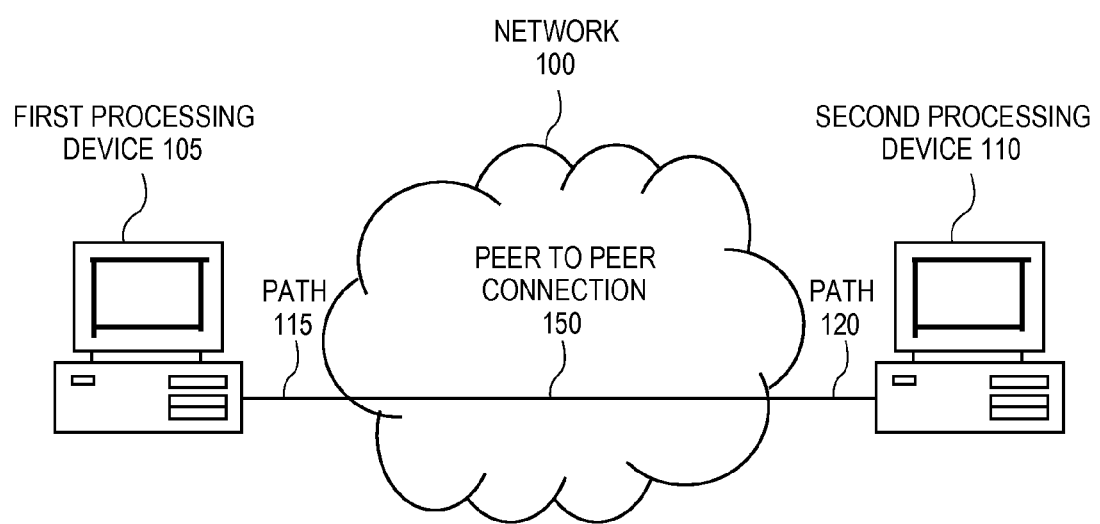
FIG. 1 illustrating a Peer to Peer network in accordance with this invention.

This invention relates to a system for generating decoy data and distributing the decoy data over a Peer to Peer network. The following is a description of exemplary embodiments in accordance with this invention. Where appropriate, components shown on different figures are given the same reference numeral throughout the description.

FIG. 1 illustrates a Peer to Peer connection 150 between a first processing device 105 and a second processing device 110. First processing device 105 is connected to network 100 via path 115. Path 115 may be a telephonic, wireless or other connection to a processing device (Not Shown) in network 100. Second processing device 110 is connected to network 100 via path 120. Path 120 may be a telephonic, wireless or other connection to a processing device (Not Shown) in network 100. Both first processing device 105 and second processing device 110 store Peer to Peer software in a memory. Peer to Peer connection 125 is made over network 100 by both first processing system 105 and second processing 110 executing the peer to peer software store in the respective memories of the processing systems.

Figure 2:
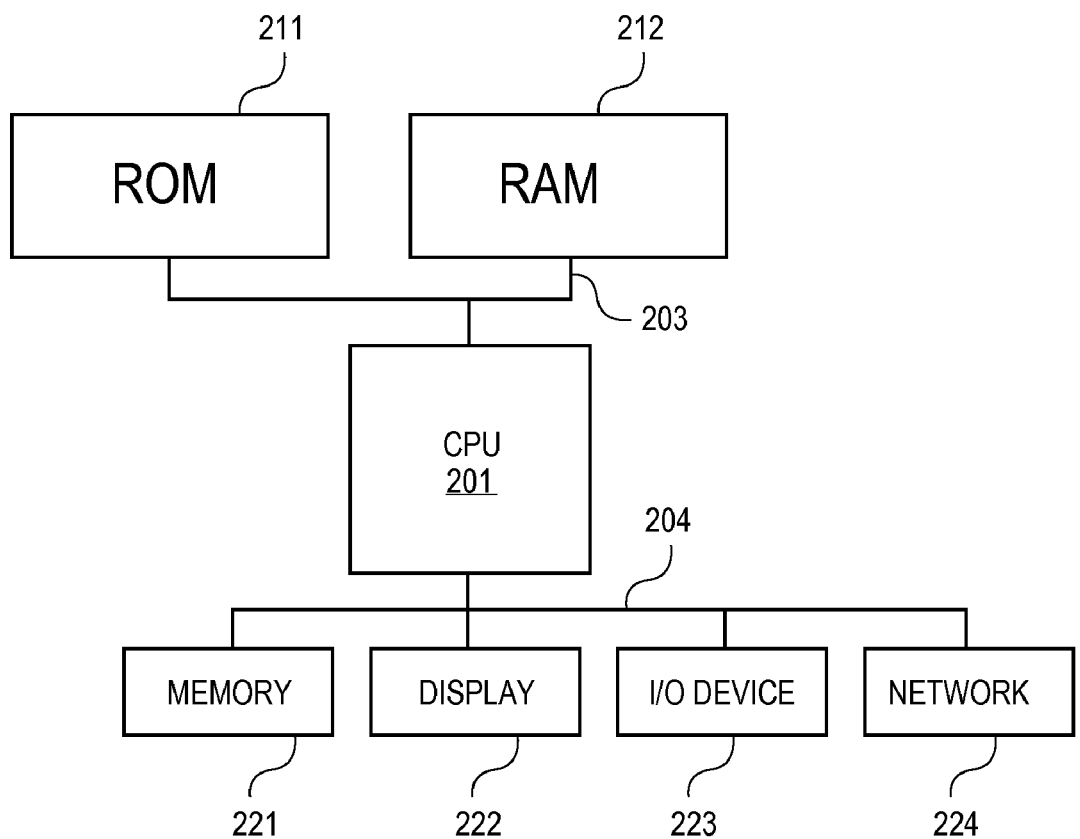
FIG. 2 illustrating a processing system executing instructions for providing a decoy data generation and distribution system in accordance with this invention.

FIG. 2 illustrates an illustrative exemplary embodiment of a processing system. A processing system is a computer or other processing device that is capable of executing instructions to provide an application. One skilled in the art will recognize that the exact configuration of a processing device executing instructions to provide a system in accordance with this invention may vary depending on the design specification of a particular processing system.

Processing system 200 has a Central Processing Unit (CPU) 201. CPU 201 is a processor, microprocessor, or any combination of processors and/or microprocessors that execute instructions stored in memory to perform an application. CPU 201 is connected to a memory bus 203 and Input/Output (I/O) bus 204.

A non-volatile memory such as Read Only Memory (ROM) 211 is connected to CPU 201 via memory bus 203. ROM 211 stores instructions for initialization and other systems command of processing system 200. One skilled in the art will recognize that any memory that cannot be written to by CPU 201 may be used for the functions of ROM 211.

A volatile memory such as Random Access Memory (RAM) 212 is also connected to CPU 201 via memory bus 203. RAM 212 stores instructions for all processes being executed and data operated upon by the executed processes. One skilled in the art will recognize that other types of memories such as DRAM and SRAM may also be used as a volatile memory and that memory caches and other memory devices (not shown) may be connected to memory bus 204.

Peripheral devices including, but not limited to, memory 221, display 222, I/O device 223, and network connection device 224 that are connected to CPU 201 via I/O bus 204. I/O bus 204 carries data between the device and CPU 201. Memory 201 is a device for storing data unto a media. Some examples of memory 221 include read/write compact discs (CDs), and magnetic disk drives. Display 222 is a monitor or display and associated drivers that convert data to a display. I/O device 223 is a keyboard, a pointing device or other device that may be used by a user to input data. Network device 224 is a modem or Ethernet "card" that connects processing system 200 to a network.

Figure 3:
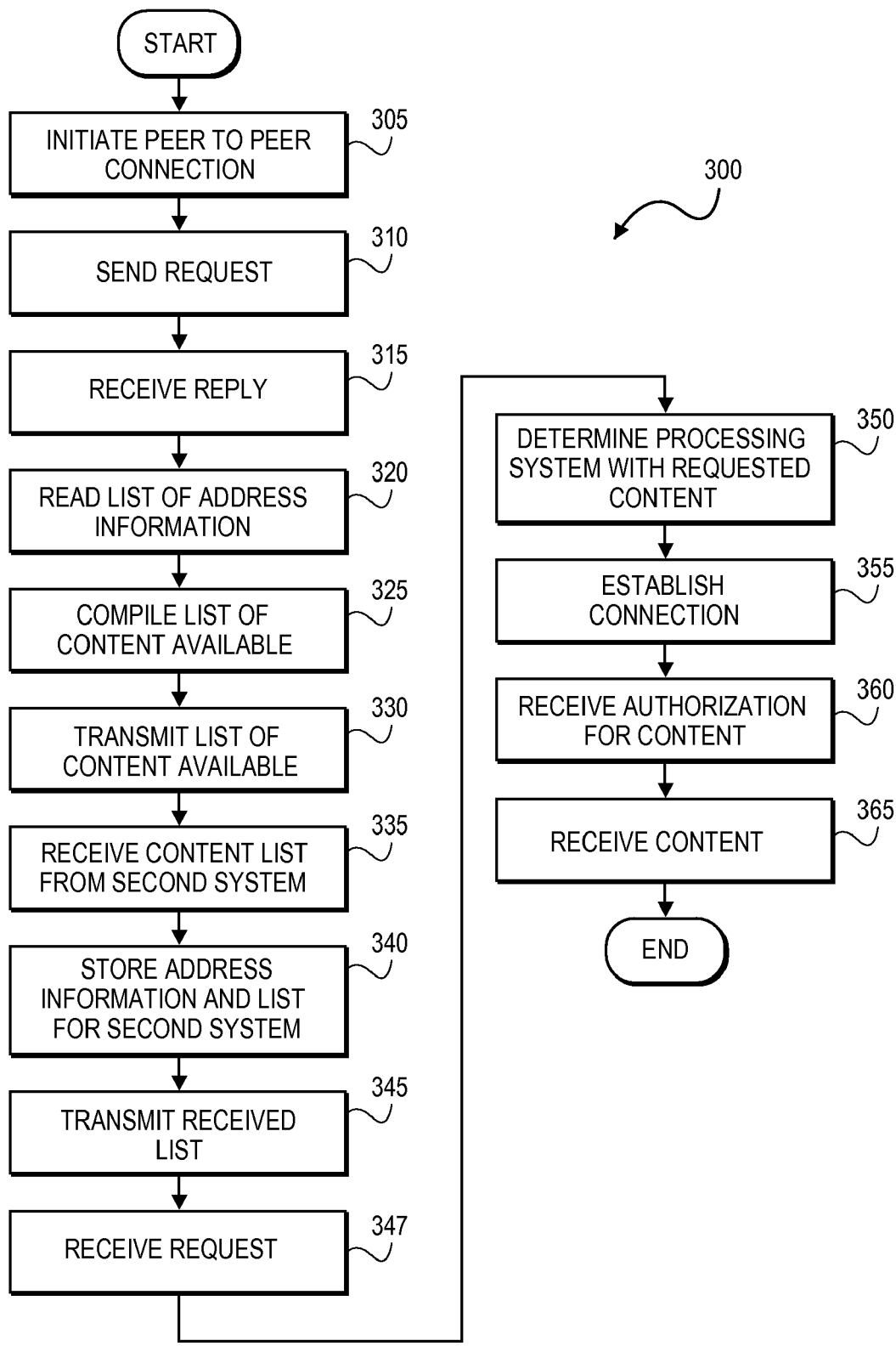
FIG. 3 illustrating a flow chart of an exemplary process for establishing a Peer to Peer network connection in accordance with this invention.

This invention relates to a system that generates and distributes decoy data for a work over a Peer to Peer network. A Peer to Peer network is a group of loosely coupled processing systems that communicate with one another to exchange files. There are many different architectures or configurations for Peer to Peer networks. The exact architecture of a Peer to Peer network is not important to providing a system in accordance with this invention. FIG. 3 illustrates an illustrative process executed by a processing system to connect to a Peer to Peer network and exchange data. One skilled in the art will appreciate that process 300 is an illustrative process and other processes may be used to connect to a Peer to Peer network and exchange data in accordance with this invention.

Process 300 begins in step 305 with the Peer to Peer software being initiated on a processing device. In step 310, the processing unit sends out a request for other processing units connected to the network and executing the Peer to Peer software to respond. In some embodiments, the processing system may transmit non-routable request over the network. In some other embodiments, the processing system may transmit a routable request over the network. In still other embodiments, the executed software includes an address on the network to contact when connecting to the Peer to Peer network. The address may be an IP (Internet Protocol) address, a URL, or other addressing protocol for transmitting data to another processing system connected to the network.

In step 315, a reply is received from a processing system connected to the network and executing the Peer to Peer software. The reply includes address information for other processing systems connected to the network and executing the peer to peer software. This address information may be an IP address, URL, or other resource location information.

In step 320, the processing system reads the list of address information and stores the list in memory. The address information may be used by the processing system to contact other processing systems in the Peer to Peer network. This list may then be sent be the processing system when another processing system in the Peer to Peer network contacts the processing system. This allows the processing system to immediately participate in the massive distribution of address information of active peers to allow all processing systems in the peer to peer network to locate and connect with other processing systems in the network. Furthermore, this allows the processing system to quickly rejoin the network the next time the processing system connects or if the processing system where to be disconnected from the network.

The processing system is now connected to the Peer to Peer network. In step 325, the processing system then compiles a list of content stored by the processing system that is available to other system on the network. In a typical network, only a descriptor of the content of a file available to share is used. However, the list may include content titles, artists, source, encoding method, genre, category, software manufacturer, right holder, and other information. In addition, this information may include a SHA-1 hash, MD5 hash, TorrentID, or other identifier that uniquely describes the content of a file available to share over the network. One skilled in the art will recognize that the exact information is left to a designer of the Peer to Peer network.

In step 330, the list is then transmitted to all processing system identified on the list of connected processing systems stored in memory. One skilled in the art will recognize that list may only be stored locally in some embodiments of peer to peer networks.

In step 335, the processing system receives lists of available contents from other processing systems in the Peer to Peer network. In step 340, the address information for the processing system from which the list was received is stored. After a list is received from a processing system, the list of contents is merged into a list of available content stored by the processing system in step 340. In step 345, the processing system may transmit the list of available content to another processing system in the network. This allows information about available content to be quickly spread to other system connected to the network.

In step 347, the processing system receives a request for content available over the network. The request may be an input from a user. The request may also be a result of an automated process that is searching for a certain content. In step 350, the processing system searches the list of available material to determine a processing system in the network that has the content available. One skilled in the art will recognize that in some systems more than one processing system storing the desired content may be contacted. However, only a second processing system is used in this example to better show the file transfer process.

In step 355, the processing system then establishes a connection with a second processing system providing the content over the network. After the connection is established, the processing system requests the content from the second processing system. One skilled in the art will recognize this request may include some authentication procedure in which the processing system requesting content must transmit authentication data to the second processing system.

In step 360, the processing system receives authorization to receive the content from the second processing system. In some systems, the second processing system may also send a denial of the transfer or an indication that the requested content is no longer available from the second processing system. In step 365, the processing system receives the requested content from the second processing system and process 300 ends.

One skilled in the art will recognize that since the list of systems on the system may change constantly that many methods may be needed to assure that a connection to a processing system providing the requested content and minimize network traffic. However, these are outside the scope of the current discussion and not important to understanding this invention.

This invention relates to the generation and distribution of decoy content for a work over a Peer to Peer network. Instead of introducing decoy content by pretending to be a peer processing system connected to the network, the decoy data for the content of the work is inserted into a file storing the content after the file has been transferred over the network. The insertion is performed by the Peer to Peer application that provides the connection to the network. The instruction for a system in accordance with this invention may be stored as software, firmware, hardware, or any other tangible medium readable by a processing system to execute the instruction to perform processes.

Figure 4:
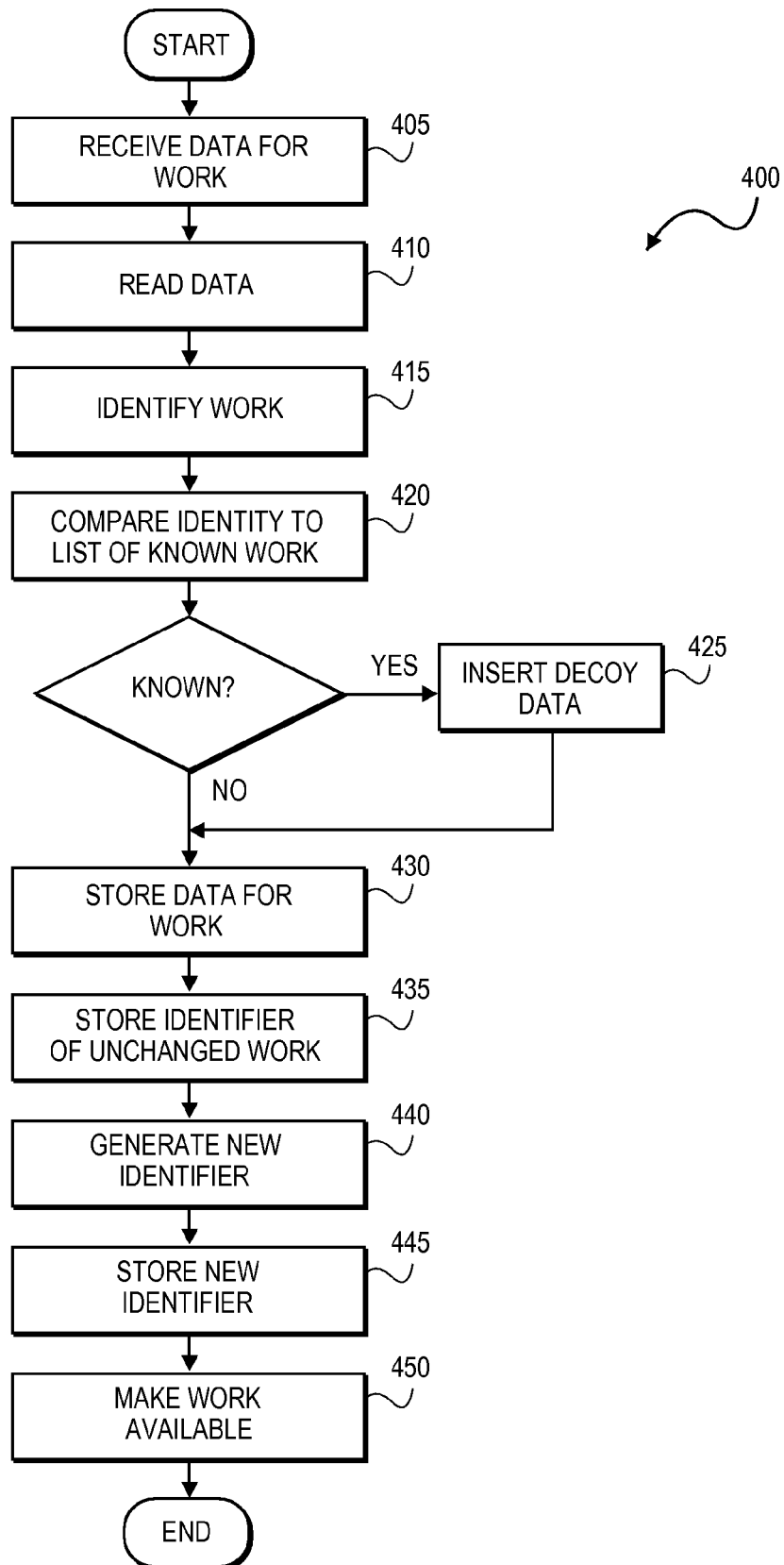
FIG. 4 illustrating a flow diagram of a process for providing the generation and distribution system in accordance with this invention.

Process 400 illustrated in FIG. 4 is an exemplary process for inserting decoy data into a file containing data for a protected work in accordance with this invention. Process 400 begins in step 400 by receiving the data of a work over a Peer to Peer network. The data may be in a data file or in some other form. In step 410, the processing system reads the data. In step 415, the work is identified by the read data. The data maybe identified using any of a variety of techniques known in the art. One method for identifying a work is described in U.S. Pat. No. 5,918,223 issued to Blum et al. which is hereby incorporated by reference as if set forth herewith to describe a method for identifying a work. One skilled in the art will recognize that other process for identifying a work may be used. One example of another method that is use is CDDB.

Once the identity is ascertained, the processing system compares the identity of the work to a list of known protected works in step 420. If the work is found on the list of protected works, the processing system creates decoy content in the data in step 425. An exemplary embodiment of the processing system of creating the decoy content is described below in process 500, shown in FIG. 5. After the decoy content is stored in the data or if the work is not on the list of known protected works, the data is stored to memory in step 430.

In step 435, the processing system stores identifiers of the undamaged data. Thus, when the processing system generates a list of available content, the identifiers for the undamaged data of the work is used. This allows the decoy content for the work to be available for transfer with the information of the undamaged copy. This allows the decoy version to defeat some processes for detecting decoy material in Peer to Peer networks.

In step 440, the processing system generates a new set of identifiers for the data including the decoy content and stores the new set of identifiers in step 445. This allows the processing system to make the decoy available under a new identifier to try to prevent detection of the decoy material. The generating of identifiers may include generating a new title, a new hash code, and/or other identifiers used to identify the content of the data.

In step 450, the processing system then makes the stored decoy data in the received file available to other processing systems connected to the Peer to Peer network and process 400 ends. When another processing system connected to the Peer to Peer network searches for a work, that processing system might locate the damaged copy of the work being shared by the processing system. The searching processing system might transfer this decoy content from the processing system to itself. Upon receiving the decoy content, the searching processing system may note the damage and discard the content in which case the P2P network has become less useful. However, upon receiving the decoy content, the searching processing system may fail to notice the damage and keep the decoy in which case the searching processing system will, in turn, share this decoy content back into the network.

The decoy data inserted into the received data may be created by a variety of techniques as commonly known in the art. In the case of an audio work, the work might have a voiceover inserted imploring the listener to "please purchase a legitimate copy". In the case of an image, the work might have a light overlay of lettering dominating the image. In the case of video, the work might be damaged by having both bold lettering inserted in the center of each frame and an imploring voiceover. In the case of software, the work might have a few key bits flipped to prevent reliable operation or bits inserted that cause the software to display a "please buy me" message when it is executed. In the case of a document, some of the content might be scrambled. The part of the content that is modified is not important. What is important is that the particular copy of the work is rendered less valuable in a way that satisfies the owner of the copyright of the work.

Figure 5:
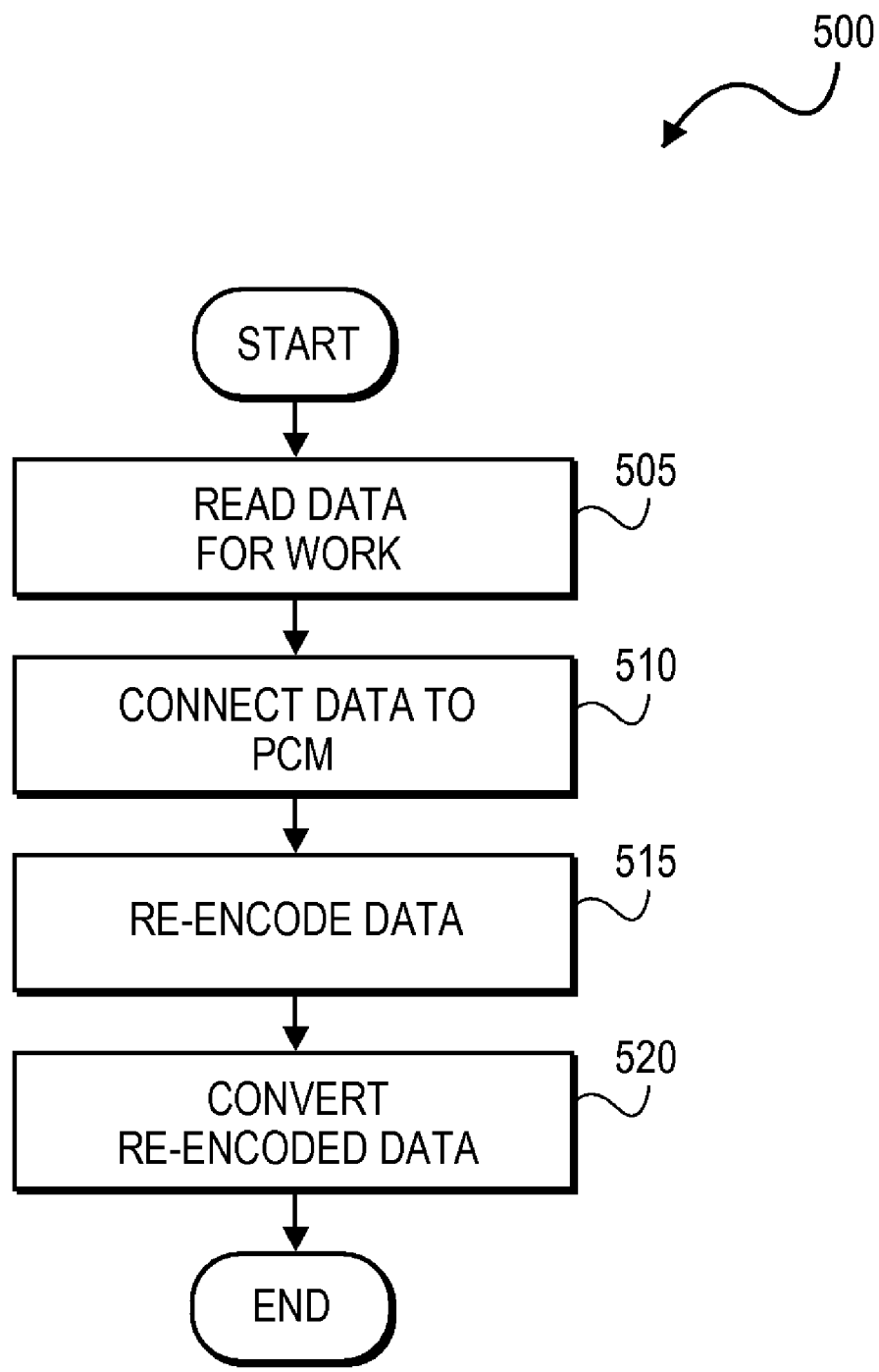
FIG. 5 illustrating a flow diagram of a process for inserting data into an audio file in accordance with an exemplary embodiment of this invention.

FIG. 5 illustrates steps in an exemplary process 500 for inserting decoy data into data of an audio work. One skilled in the art will recognize that there are many other methods for inserting voice over and other types of data into data for an audio work that may be implemented. One skilled in the art will further recognize that other types of processes may be necessary for other types of works including images and audio/visual works.

Process 500 begins in step 505 with the data for the work being read. In step 510, the content of the audio work is converted into a Pulse Code Modulation (PCM) format. In step 515, the data is altered. The re-encoding may include reducing the volume of the content by 70% and/or inserting a voice over. Another method of re-encoding may include replacing audio frames directly. The replacement causes an abrupt transition from the work to the inserted data. After the audio data is altered, the PCM data is re-encoded in a form suitable for storage in step 520 and process 500 ends.

In this way each peer on the network becomes a source of decoy content. There is no need for a copyright holder to employ massive spoofing technology to flood the network. As peers naturally migrate to different IP addresses through the normal mechanisms well known in the art, it will be difficult for the P2P network to excise the peer or the content from the network. Essentially the network will become unable to trade undamaged content unless the copyright owner allows it.

One skilled in the art will recognize that the above is a description of exemplary embodiments of this invention. It is envisioned that those skilled in the can and will derive alternative designs that infringe this invention as set forth in the claims below either literally or through the Doctrine of Equivalents.

What is claimed is:

1. A method for providing decoy data for a work in a peer to peer network, comprising:
    receiving, by a computing device hosting a peer in the peer to peer network, supplied data for a current work over a peer to peer connection, the supplied data including supplied identifier information of said data for said current work, wherein the supplied identifier information includes a supplied hash code of the data;
    generating a feature vector of the current work;
    determining whether said current work is a protected work based on a comparison of the feature vector to a plurality of stored feature vectors of protected works;
    inserting, by said computing device, said decoy data into said supplied data for the current work to generate modified data for the current work responsive to a determination that said feature vector is similar to one of the plurality of stored feature vectors;
    generating new identifier information for said modified data based on said decoy data, the new identifier information including a new hash code of the modified data;
    storing said modified data for said current work, including said decoy data, said supplied identifier information and said new identifier information, in a memory, wherein said modified data is associated with the supplied identifier information and said modified data is associated with the new identifier information, wherein the supplied identifier information is used to identify the supplied data in the peer to peer network and the new identifier information is used to identify the modified data in the peer to peer network; and
    determining whether to use the supplied identifier information or the new identifier information for said modified data, wherein the determined identifier information identifies the modified data to another processing system.

2. The method of claim 1 further comprising:
    making said modified data for said current work available for transfer over said peer to peer network.

3. The method of claim 1 further comprising:
    if it is determined to use the supplied identifier information, making said modified data for said current work available for transfer over said network using said supplied identifier information.

4. The method of claim 1 further comprising:
    if it is determined to use the new identifier information, making said modified data for said current work available for transfer over said peer to peer network using said new identifier information.

5. The method of claim 1, wherein an identity of said current work is ascertained upon the determination that said feature vector is similar to one of the plurality of stored feature vectors.

6. The method of claim 5, wherein said step of determining whether said current work is the protected work comprises:
    comparing said identity of said current work to a list of known protected works responsive to a determination of said identity of said current work; and
    determining said current work is the protected work responsive to said identity being on said list of protected works.

7. The method of claim 1, wherein said current work is an audio work and said step of inserting the decoy data comprises: inserting a voice over into said supplied data for the current work.

8. The method of claim 1, wherein said current work is an audio work and said step of inserting the decoy data comprises: reducing a volume of said current work.

9. The method of claim 1, wherein said current work is an image and said step of inserting said decoy data comprises: inserting an overlay that dominates said image.

10. The method of claim 1, wherein said current work is a video work and said step of inserting said decoy data comprises: inserting lettering in each frame of said video.

11. The method of claim 1, wherein said current work is a video work and said step of inserting said decoy data comprises: inserting audio into an audio portion of said video.

12. An apparatus for providing decoy data for a work in a peer to peer network, comprising:
    means for receiving supplied data for a current work over a peer to peer connection, the supplied data including supplied identifier information of said supplied data for said current work, wherein the supplied identifier information includes a supplied hash code of the data;
    means for generating a feature vector of said current work;
    means for determining whether said current work is a protected work based on a comparison of the feature vector to a plurality of stored feature vectors of protected works;
    means for inserting said decoy data into said supplied data for said current work to generate modified data for the current work responsive to a determination that said feature vector is similar to one of the plurality of stored feature vectors;

means for generating new identifier information for said modified data based on said decoy data, the new identifier information including a new hash code of the modified data;

means for storing said modified data for said current work, including said decoy data, said supplied identifier information and said new identifier information in a memory, wherein said modified data is associated with the supplied identifier information and said modified data is associated with the new identifier information, wherein the supplied identifier information is used to identify the supplied data in the peer to peer network and the new identifier information is used to identify the modified data in the peer to peer network; and means for determining whether to use the supplied identifier information or the new identifier information for said modified data, wherein the determined identifier information identifies the modified data to another processing system.

13. The apparatus of claim 12 further comprising:
means for making said modified data for the current work available for transfer over said peer to peer network.

14. The apparatus of claim 12 further comprising:
means for making said modified data for said current work available for transfer over said network using said identifier information if it is determined to use the supplied identifier information.

15. The apparatus of claim 12 further comprising:
means for making said modified data for said current work available for transfer over said peer to peer network using said new identifier information if it is determined to use the new identifier information.

16. The apparatus of claim 12, wherein an identity of said current work is ascertained upon the determination that said feature vector is similar to one of the plurality of stored feature vectors.

17. The apparatus of claim 16, wherein said means for determining whether said current work is the protected work comprises:
means for comparing said identity of said current work to a list of known protected works responsive to a determination of said identity of said current work; and
means for determining that said current work is the protected work responsive to said identity being on said list of protected works.

18. The apparatus of claim 12, wherein said current work is an audio work and said means for inserting said decoy data comprises: means for inserting at least one of a voice over into said supplied data for said current work and reducing a volume of said current work.

19. The apparatus of claim 12, wherein said current work is an image and said means for inserting said decoy data comprises: means for inserting an overlay that dominates said image.

20. The apparatus of claim 12, wherein said current work is a video work and said means for inserting said decoy data comprises: means for inserting lettering in each frame of said video.

21. The apparatus of claim 12, wherein said current work is a video work and said means for inserting said decoy data comprises: means for inserting audio into an audio portion of said video.

* * * * *